US005456434A

United States Patent [19]
Lomauro

[11] Patent Number: 5,456,434
[45] Date of Patent: Oct. 10, 1995

[54] ENGINE HEAD STAND ASSEMBLY

[76] Inventor: Stephen H. Lomauro, 53 E. Railroad Ave., Jamesburg, N.J. 08831-1462

[21] Appl. No.: 166,452

[22] Filed: Dec. 13, 1993

[51] Int. Cl.$^6$ ..................................................... F16M 11/00
[52] U.S. Cl. .......................... 248/176.3; 248/415; 269/51; 269/71; 269/78
[58] Field of Search ..................................... 248/176, 178, 248/186, 187, 415, 418, 519, 676; 269/77, 78, 71, 50, 51, 101

[56] References Cited

U.S. PATENT DOCUMENTS

| | | | |
|---|---|---|---|
| 1,054,246 | 2/1913 | Stauffer | 269/78 |
| 1,065,979 | 6/1913 | Spencer . | |
| 1,213,127 | 1/1917 | Osborne et al. . | |
| 1,272,613 | 6/1918 | Broemel . | |
| 1,382,811 | 6/1921 | Sullivan . | |
| 1,750,199 | 3/1930 | Spahn . | |
| 1,792,612 | 2/1931 | Staley . | |
| 2,188,433 | 1/1940 | Friese | 269/78 |
| 2,211,287 | 8/1940 | Neubig et al. | 269/78 |
| 2,602,615 | 6/1952 | Maynard et al. . | |
| 2,763,053 | 9/1956 | Anderson | 269/78 |
| 3,773,312 | 11/1973 | Victorino | 269/50 |
| 3,831,261 | 8/1974 | Gell | 269/50 X |
| 4,660,814 | 4/1987 | Shader et al. | 269/71 X |
| 4,971,286 | 11/1990 | Silhan | 248/676 |
| 5,014,656 | 5/1991 | Leptich et al. . | |
| 5,088,311 | 2/1992 | Inoue | 72/333 |
| 5,160,125 | 11/1992 | Jenkins | 269/50 |
| 5,224,691 | 7/1993 | Clark | 269/71 X |

FOREIGN PATENT DOCUMENTS

| | | | |
|---|---|---|---|
| 298008 | 6/1902 | France | 269/71 |
| 2032300 | 6/1970 | Germany | 269/71 |
| 3509935 | 9/1985 | Germany | 269/71 |

OTHER PUBLICATIONS

IBM Technical Disclosure Bulletin vol. 25 No. 4, Sep. 1982 "Clean Room Robot".

Primary Examiner—Alvin C. Chin-Shue
Assistant Examiner—Korie H. Chan
Attorney, Agent, or Firm—Arthur L. Plevy

[57] ABSTRACT

A stand assembly for supporting a cylinder head having a threaded spark plug aperture, includes a base for stabilizing the stand assembly and a pivot clamp with a removable mandrel having a threaded end that engages the threaded spark plug aperture of the cylinder head.

6 Claims, 4 Drawing Sheets

ENGINE HEAD STAND ASSEMBLY

FIELD OF THE INVENTION

The present invention relates generally to a stand assembly for supporting an engine cylinder head, and more particularly to a stand assembly for supporting a motorcycle engine cylinder head.

BACKGROUND OF THE INVENTION

Engine cylinder head repairs and modifications including assembly, disassembly, and machining, etc., typically require that the cylinder head be supported in some sort of fixture or stand in order to perform the aforementioned procedures safely and accurately. Stands for supporting internal combustion engines and other related objects for assembly, servicing, display, and other purposes are well known in the art. The prior art stands are configured to allow the supported objects to be oriented into various positions so that the objects can be assembled, disassembled, machined, and displayed, etc. U.S. Pat. No. 1,213,127 to Horton shows a support rack that has a rectangular base and an arm that is pivotally attached to the rectangular base. In the Horton patent, the support that rests on top of the pivotable arm is designed for displaying an object. U.S. Pat. No. 1,272,613 to Broemel shows a machine stand that has interchangeable mandrels that are attachable at various points on the stand. The mandrels can be removed, attached, or interchanged as desired. U.S. Pat. No. 1,792,612 to Staley shows an engine stand device that is rotatable. As such, an engine can be mounted to the stand and rotated to any desired position. In the Stanley patent, the engine mounts to the stand utilizing the engine mounting bolts. The mounting brackets on the stand are adjustable in position so it can be attached to any one of a number of different engine mounts. U.S. Pat. No. 2,602,615 to Maynard shows an engine stand that is used to support an engine by the end of its crank shaft. U.S. Pat. Nos. 1,382,811, 1,750,199, 1,065,979, and 4,971,286 all show engine stands that attach to engines utilizing the engine mounting brackets that already exist on the engine.

As can be seen, the prior art stands are not particularly well suited for holding internal combustion engine cylinder heads, especially, motorcycle cylinder heads as some type of adaptor is necessary for attaching the head to the stand. Furthermore, the majority of the prior art stands are too bulky to be conveniently used by the technician as they generally consist of rather large frameworks that are designed for holding heavier objects such as engine blocks or entire engine and transmission assemblies.

Up until now, because of the deficiencies of the prior art stands, the technician has had to employ an adaptor to connect the head to an existing prior art stand, use a make-shift supporting fixture, or physically hold the cylinder head with their hands or lap while performing the aforementioned procedures. Adapters or make shift-fixtures are cumbersome to set-up and can be unstable. Typically, they are not adjustable to position the head in various orientations required for machining, etc. As such, the use of these devices increases the probability of machining errors, which can in some instances, result in the destruction of the cylinder head. Even if the machining errors are correctable, additional machining operations are costly and must be absorbed by either the facility performing the work or the owner of the cylinder head. Moreover, the time-consuming nature of setting up an adaptor or a make-shift fixture, in many instances, encourages the technician to physically hold the cylinder head while machining or performing some other procedure on the head. Doing so is extremely risky in view of the dangerous nature of the power tools employed to perform the machining and other procedures on the head. Furthermore, physically holding the cylinder head during machining is not conducive to accurate, error-free machining.

It is, therefore, an objective of the present invention to provide a stand that is adapted to hold an engine cylinder head, particularly, a motorcycle cylinder head, in a plurality of orientations by threadedly engaging the threaded spark plug aperture of the cylinder head.

SUMMARY OF THE INVENTION

In the practice of the present invention, a stand for supporting a cylinder head having a threaded spark plug aperture is provided comprising an arm assembly having means for receiving a removable mandrel in a plurality of axial positions, said removable mandrel including means for threadedly engaging the threaded spark plug aperture and a base having an upstanding flange, said arm assembly being pivotally attached to said upstanding flange to allow the engine cylinder head to be adjusted in a plurality of orientations. The stand assembly further includes rotation means for allowing the engine cylinder head to be rotated without moving the stand assembly.

DETAILED DESCRIPTION OF THE PREFERRED EMBODIMENTS

Figure 1:
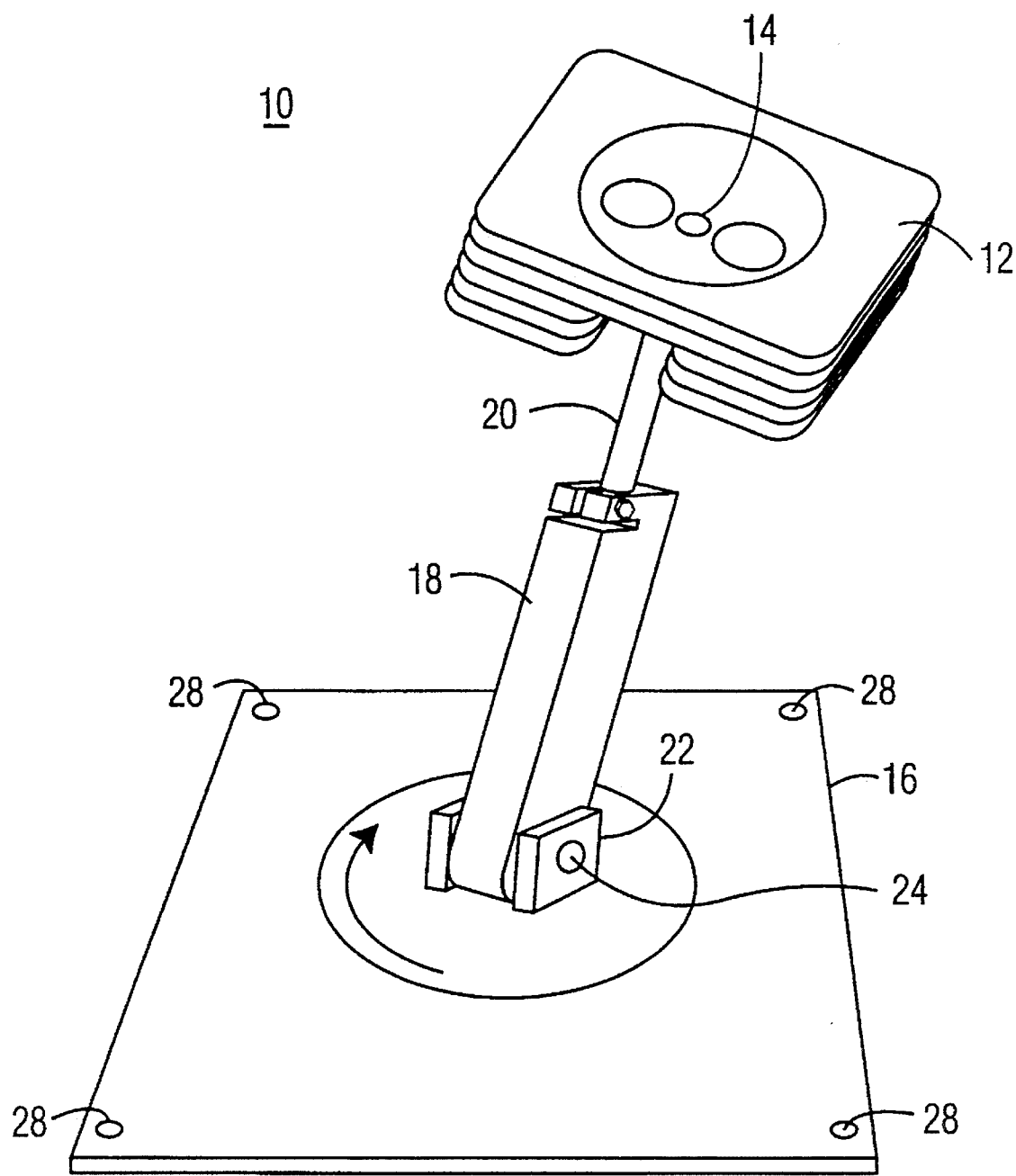
FIG. 1 is a front, top view of a cylinder head stand embodying the present invention, with a motorcycle cylinder head mounted thereon.

Detailed embodiments of the present invention are disclosed herein; however, the disclosed embodiments are merely exemplary of the invention, which may be embodied in various forms. As such, specific structural and functional details disclosed herein are not to be interpreted as limiting, but merely as a basis for the claims and as a representative basis for teaching one skilled in the art to employ the present invention.

Referring to the drawings, the reference numeral 10 generally designates the present invention, a stand assembly for an object, such as a motorcycle engine cylinder head 12. Although the stand assembly 10 is particularly well adapted for supporting motorcycle engine cylinder heads, such objects are only exemplary and other types of engine cylinder heads or objects could be supported by the stand assembly 10 of the present invention.

As shown in FIG. 1, the engine head stand assembly 10 generally comprises a base 16 for supporting the stand assembly 10 and a pivotally connected arm assembly 18 including a removable mandrel 20 for attaching the motorcycle engine cylinder head 12 to the stand assembly 10. The removable mandrel 20 is adapted to be threaded into the threaded spark plug aperture 14 of the cylinder head 12. The engine head stand assembly 10 can be made from steel or any other suitable material.

The base 16 generally comprises a square planar member but any suitable shape or form is contemplated. Attached to a substantially central portion of the base 16 is an upstanding flange member 22. The flange member 22 can be attached to the base 16 by welding or any other suitable means. The flange member 22 includes a threaded aperture 24 for receiving a threaded fastener or pivot bolt 26 (see FIG. 3). The base 16 further includes a plurality of apertures 28 for allowing the stand assembly 10 to be permanently installed on a table or workbench using suitable fasteners.

Figure 2:
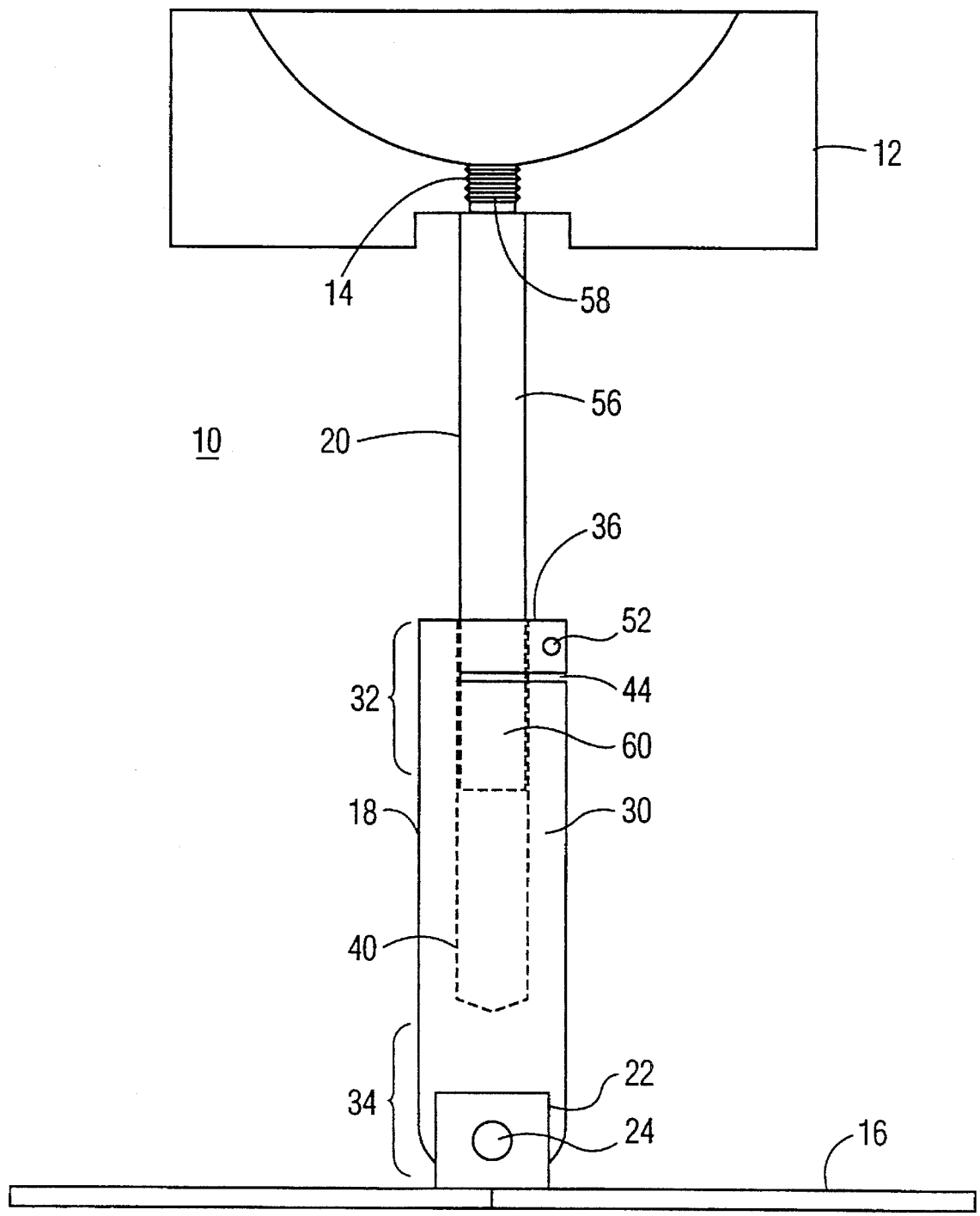
FIG. 2 is an elevational of the embodiment shown in FIG. 1.
Figures 3, 4:
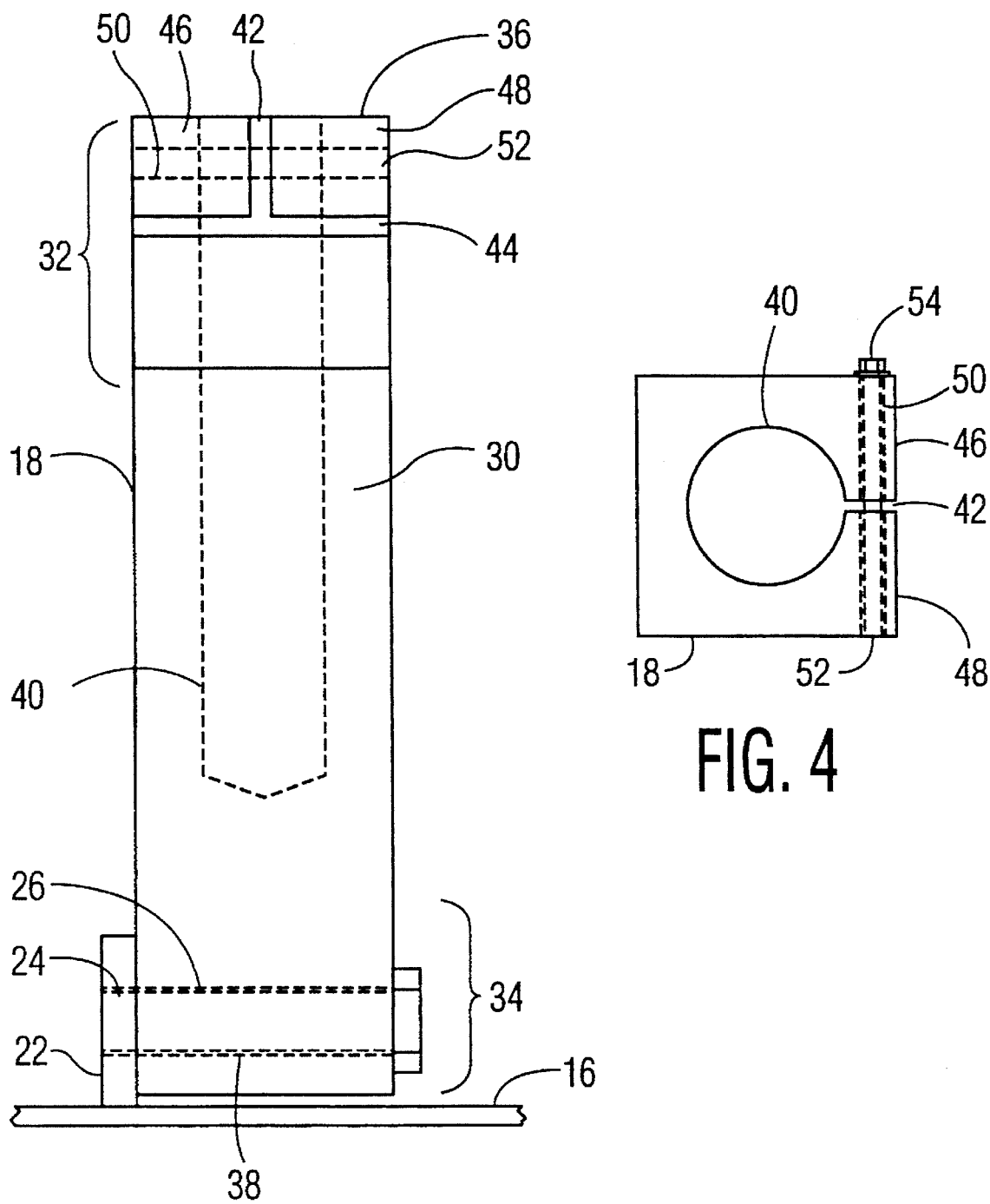
FIG. 3 is an elevational view of an alternate embodiment of the arm assembly of the present invention.
FIG. 4 is a top view of the arm assembly.

The arm assembly 18 as best shown in FIGS. 2 and 3, generally comprises an elongated body 30 having upper and lower portions 32 and 34. The upper portion 32 of the arm assembly 18 includes a clamping member 36 for locking and retaining the removable mandrel 20. In FIG. 3 the lower portion 34 of the arm assembly 18 includes an aperture 38 for receiving the pivot bolt 26. A bore 40 for receiving the removable mandrel 20 begins at the upper portion 32 of the elongated body 30 of the arm assembly 18 and extends partially therethrough. The length of the bore 40 is adapted to allow the removable mandrel 20 to be positioned at a plurality of insertion depths for allowing the working height of the cylinder head 12 to be adjusted. When the stand 10 is assembled, the lower portion 34 of the arm assembly 18 connects to the upstanding flange member 22 using the pivot bolt 26. The pivot bolt 26 acts like an axle, allowing the arm assembly to be pivoted relative to the base 16 by merely loosening the pivot bolt 26. The pivot bolt 26 is adapted to receive a ratchet socket wrench or any other suitable tool for tightening and loosening the pivot bolt 26.

The clamping member 36 portion of the arm assembly 18 comprises a first slot 42 starting at the top surface of the arm assembly 18 and extends both horizontally into the bore 40 and vertically into a second slot 44. The second slot 44 starts on the side wall of the arm assembly 18 just below the first slot 42 and extends horizontally into the bore 40. The first and second slots 42 and 44 define a pair of unitarily formed clamping fingers 46 and 48 as best seen in FIG. 4. Apertures 50 and 52 extend through respective clamping fingers 46, 48 and are adapted to receive a threaded clamping screw 54. When the clamping screw 54 is tightened, clamping fingers 46 and 48 are drawn together across the first slot 42 which causes the diameter of the bore 40 in the area adjacent to clamping fingers 46 and 48 to become smaller thereby creating a clamping force on the removable mandrel 20.

As best seen in FIG. 2, the removable mandrel 20 comprises a cylindrical elongated body 56 having a threaded end 58 and a non-threaded end 60. The threaded end 58 is sized to be threadedly received within the threaded spark plug aperture 14 of the cylinder head 12. The non-threaded end 60 is sized to be slip-fitted into the bore 40 of the arm assembly 18 when the clamping member 36 is loosened. A plurality of removable mandrels having various thread sizes for adapting the stand assembly to various types of cylinder heads are contemplated.

When it becomes desirable to rotate a cylinder head 12 supported by the stand assembly 10 of the present invention one merely loosens the clamping screw 54 and rotates the cylinder head 12. This is made possible by virtue of the fact that the removable mandrel 20 turns freely within the bore 40 of the arm assembly 18. Once the desired angular rotation is set, the clamping screw 54 is tightened. It should be understood, however, that once the clamping screw 54 is loosened, the weight of the cylinder head 12 causes the mandrel 20 to sink into the bore 40 of the arm assembly 18 thereby changing the supporting height of the cylinder head 12, thus, every time the rotational orientation of the cylinder head 12 is changed the working height of the cylinder head must be readjusted. When it is desirable to rotate the cylinder head 12 without having to reset the working height of the cylinder head 12 additional rotational means can be provided. Rotational means can be provided on either the base 16 of the stand assembly 10 or on the arm assembly 18. The embodiment shown in FIG. 1 includes rotational means provided in the form of a rotating central member 62 either attached to or integral with the base 16. It is understood that any suitable structure can be used as bases with rotating members are well known in the art and include Lazy-Susan or turntable like arrangements. Regardless of the arrangement chosen, the upwardly extending flange member 22 is attached to the rotating member 62 of the base 16. FIG. 3 shows an embodiment wherein rotational means are provided on the arm assembly. In this embodiment, the upper potion 32 of the arm assembly 18 is made to rotate with respect to the lower portion 34 of the arm assembly 18 using any well known means for providing relative rotation between the upper and lower portions of the arm assembly. The embodiments of either FIG. 1 or FIG. 2 further include means for locking the rotational means once the desired rotational angle is chosen. Such locking means are well known in the art and include locking pin or locking clamp arrangements.

Figure 5:
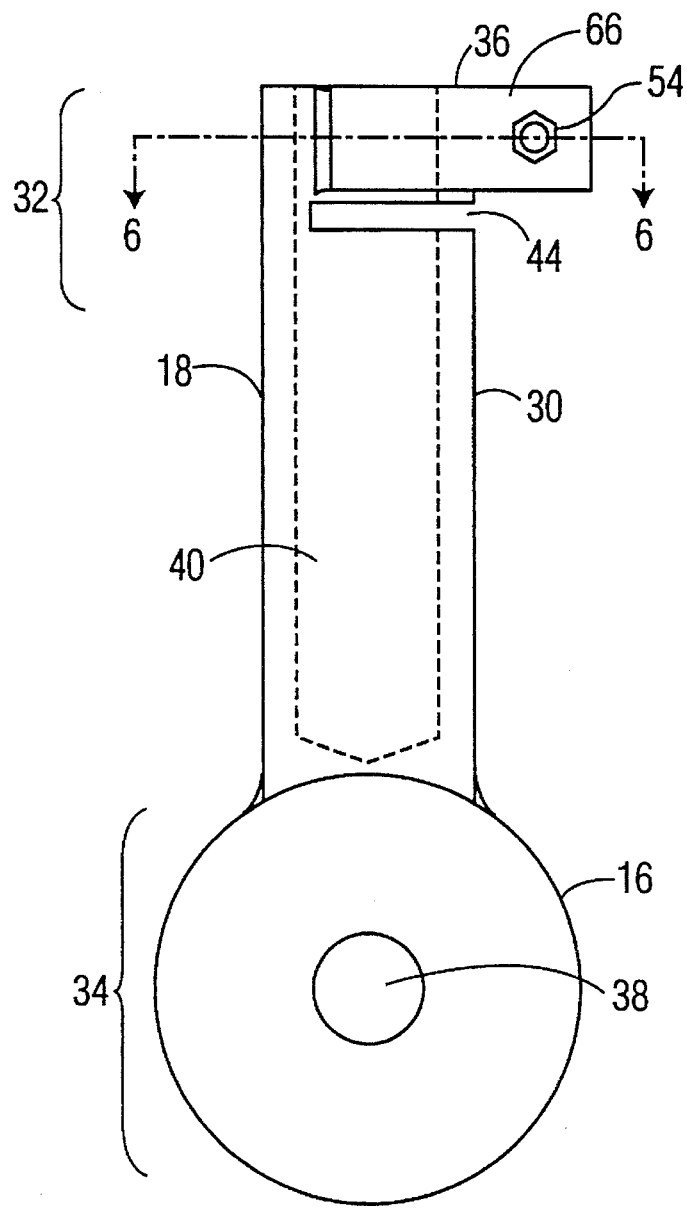
FIG. 5 is a detailed side elevational view of a third embodiment of the arm assembly.
Figure 6:
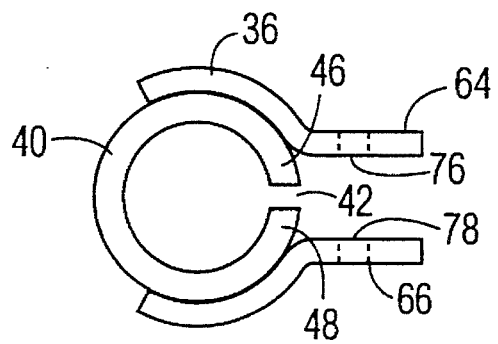
FIG. 6 is a cross sectional view of the arm assembly of FIG. 5 along line 6—6.

FIGS. 5 and 6 show another embodiment of the arm assembly where like numerals designate like elements. The elongated body 30 of the arm assembly 18 is cylindrical in shape and includes a bore 40. The lower portion 34 comprises a separately attached circular member that is attached by welding or any other suitable means to the elongated body 30. The clamping member portion 36 of the arm assembly comprises a first slot 42 starting at the top surface of the upper portion 32 and extends axially into a second slot 44. The first and second slots define a pair of unilaterally formed clamping fingers 46 and 48. A pair of leveraging fingers 64 and 66 are attached respectively to clamping fingers 46 and 48 by welding or any other suitable means. Each leveraging finger includes respective apertures 76 and 78. Apertures 76 and 78 are adapted to receive a threaded clamping screw 54. When the clamping screw 54 is tightened, clamping fingers 46 and 48 are drawn together by leveraging fingers 64 and 66 across first slot 42 which reduces the diameter of bore 40 in the area adjacent to the clamping fingers 46 and 48, thereby creating a clamping force on the removable mandrel 20.

In operation, the stand assembly 10 is adapted for supporting an object, such as a motorcycle cylinder head 12, in a plurality of orientations or positions by including adjustments for adjusting the working height, tilting angle, and rotational angle of the cylinder head 12. The cylinder head 12 can be connected to the stand assembly 10 by grasping the removable mandrel 20 and threading the threaded portion 58 of the removable mandrel 20 into the thread spark plug aperture 14 of the cylinder head 12. The clamp screw 54 is loosened and the non-threaded end 60 of the removable mandrel 20 is then inserted into the bore 40 of the arm assembly 18 by grasping the cylinder head 12 and removable mandrel 20 and guiding the non-threaded end 60 of the mandrel 20 into the bore 40 of the arm assembly 18. The working height of the cylinder head is then adjusted by either increasing or decreasing the axial insertion depth of the removable mandrel 20 within the bore 40 of the arm assembly 18. Once the desired height is obtained the clamp screw 54 is tightened. The cylinder head 12 can be tilted by loosening the pivot bolt 26, grasping the cylinder head 12 to adjust the head to the desired angle, and then tightening the pivot bolt 26.

The stand assembly 10 can be permanently mounted to a table or workbench, etc., by using fasteners adapted to pass through apertures 28 provided in the base 16. If it is desirable to transport the stand assembly 10 to different locations, its compact size allows it to be easily lifted by grasping it at the base 16 and transporting it to another location without the need for disassembling any of the components thereof. The stand assembly's 10 compact size also allows it to be stored in a minimum of space when not in rise.

It should be understood that the stand assembly 10 of the present invention is not to be limited to the specific forms or arrangement of parts described and shown wherein. As such, any variations or modifications to the invention just described are intended to be included within the scope of the invention as defined by the appended claims.

I claim:

1. In a stand assembly for supporting an engine cylinder head having at least one threaded spark plug aperture, in a plurality of orientations, said stand assembly being of the type having an arm assembly pivotally attached to a base, the improvement comprising:

mandrel means received by said arm assembly for threadedly engaging the at least one threaded spark plug aperture of the engine cylinder head.

2. The stand assembly of claim 1, further comprising rotation means for allowing said mandrel means to be rotated relative to said base.

3. The stand assembly of claim 2, wherein said rotation means is a portion of said arm assembly.

4. The stand assembly of claim 1, wherein said rotation means is a portion of said base assembly.

5. The stand assembly of claim 1, wherein said arm assembly includes means for removably receiving said mandrel means in plurality of axial positions.

6. The stand assembly of claim 5, wherein said means for removably receiving said mandrel means includes means for locking and unlocking said mandrel means in said plurality of axial positions.

\* \* \* \* \*